July 19, 1955  J. R. CABBE  2,713,663
VACUUM-TUBE VOLTMETER
Filed June 14, 1952
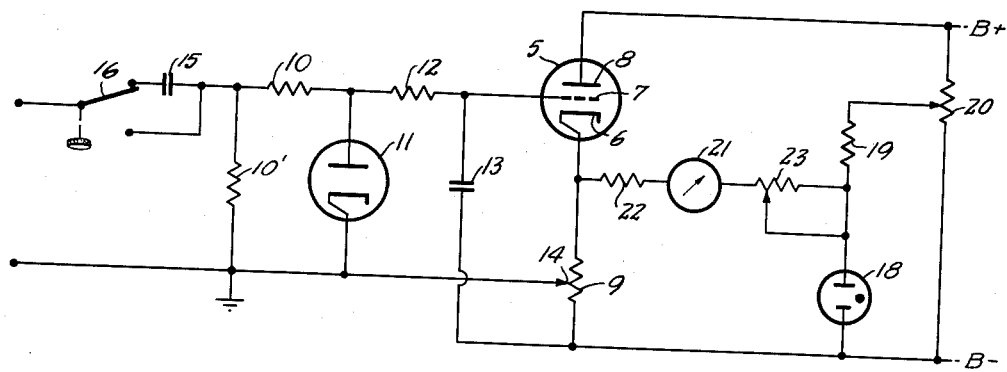
INVENTOR.
JOHN R. CABBE
BY Mitchell Bechert
ATTORNEYS

United States Patent Office 2,713,663
Patented July 19, 1955

2,713,663

VACUUM-TUBE VOLTMETER

John R. Cabbe, Bayside, N. Y., assignor to Servo Corporation of America, New Hyde Park, N. Y., a corporation of New York Application June 14, 1952, Serial No. 293,572

1 Claim. (Cl. 324—123)

My invention relates to a vacuum-tube voltmeter or the like.

It is an object of the invention to provide an improved vacuum-tube voltmeter.

It is a specific object to provide a vacuum-tube voltmeter offering substantially linear performance characteristics at the low end of the scale.

It is a further object to meet the above objetcs with a device incorporating means for automatically compensating for line-voltage fluctuations and for variations in vacuum-tube performance as the vacuum tubes heat, thereby reducing delays occasioned by the need for a warm-up period.

Other objects and various further features of novelty and invention will be pointed out or will occur to those skilled in the art from a reading of the following specification in conjunction with the accompanying drawing, which shows, for illustrative purposes only, preferred electric-circuit connections for a device embodying the invention.

Briefly stated, the invention contemplates an improved vacuum-tube voltmeter wherein linearity is achieved at low-scale readings by having an amplifier tube continuously conduct under all input-voltage conditions, even for zero input-voltage. Since this tube is always conducting, it will always develop an output potential. Metering may be accomplished by measuring changes in such output potential as a function of a reference voltage. The reference voltage may be provided by simple regulating means, such as a neon tube. The amplifying tube may be connected as a cathode follower, so that low input voltages, which appear as low voltage increments over the reference voltage, may be deduced by a sensitive meter placed between the voltage-regulating means and the load impedance of the cathode follower.

Referring to the drawing, my invention is shown in application to a vacuum-tube voltmeter employing a single amplifying means, such as the vacuum tube 5, having a cathode 6, a grid 7, and an anode 8. I have employed the tube 5 as a cathode follower by providing an output or load impedance 9 connected to the cathode 6, so that the B-supply voltage may be connected directly to the anode on the positive side and to the impedance 9 on the negative side.

As indicated generally above, the tube 5 preferably conducts, even under conditions of zero input voltage. To this end, the input circuit may include biasing means for achieving the desired potential of the grid 7 with respect to that of the cathode 6. The input may also include rectifying means and smoothing means, so as to render the meter essentially a D.-C. meter, even under conditions of A.-C. input signals. In the form shown, I provide these functions with a diode 11 and with smoothing means, such as a series resistor 12 and a shunt capacitor 13, across the input circuit, capacitance 13 being connected between the grid 7 and the low-potential end of the impedance 9. In order to adjust the biasing level, as when initially calibrating the device, I prefer that the low-potential end of the rectifying means 11 shall be adjustably connected across a part of the impedance 9, as suggested at 14. The remainder of the input circuit may include series and shunt resistors 10—10' and a series capacitor 15, for use under A.-C. measuring conditions, as selected by a manual switch 16; if the device is to respond to D.-C. input signals, the capacitor 15 may be shunted when the switch 16 is shifted to its other position.

As indicated above, I achieve my metering function by comparing the voltage developed across the load impedance 9 against a reference voltage, as developed by voltage-regulating means. The voltage-regulating means may comprise a gas-filled discharge device, such as the neon tube 18. Tube 18 and a dropping resistor 19 may be energized from the B-supply voltage, as through adjustably tapped connections to a potentiometer 20, across the B-supply. For metering purposes, a sensitive microammeter 21 may be connected between the high-potential end of the load impedance 9 and the high-potential end of the voltage-regulating means 18. I have provided series resistors 22—23, of relatively high impedance compared to that of the cathode load impedance 9, for limiting the current in the metering circuit.

In operation, the tube 5 is biased to be normally conductive on the linear part of its characteristic under conditions of zero input signal. Under these conditions, a voltage will be developed across the resistor 9; and if this voltage matches that developed by the voltage-regulating means 18, then no current can flow through the meter circuit, so that the meter 21 will indicate zero input voltage. An initial adjustment at 14 will be understood to effect the desired biasing of tube 5 to assure the described voltage relationship under conditions of zero input voltage. If the input voltage should increase (negative increase), tube 5 will become less conductive, so that a lower voltage will be developed across the load impedance 9. This will cause the appearance of a meter-deflecting voltage, represented by the difference between the reference voltage and the load-impedance voltage. Since the tube 5 was already operating on the linear part of its characteristic, even for zero applied voltage, any increase in applied voltage, however slight, involves further operation on the linear part of the characteristic, with the result that meter indications for these low-voltage conditions may involve linear displacements in the display.

It will be observed that the described circuit incorporates a number of further features. For example, as the tubes 5—11 warm up, their operating points may change slightly. But I have so connected these tubes that shifts in their operating points (as a function of warm-up time) tend to compensate for one another. Thus, as the cathode of diode 11 heats, there is an increase in voltage across the diode 11. This increases the negative potential on grid 7. At the same time, the cathode 6 of tube 5 will be heating, so as to increase the potential of cathode 6. Since both effects occur at the same time and in opposite directions, the result achieved is relatively stable operation, even during the warm-up period.

As a further feature, it will be observed that under no conditions can an unsafe current be passed through the meter 21. The predominant current at all times passes through the load impedance 9, which is substantially smaller than the combined impedance of elements 19, 22, and 23. In a typical construction wherein the voltmeter is to respond over a scale range of 20 volts, an ammeter 21 having a range of 0–200 microamperes need never be overloaded.

It will be seen that I have provided a vacuum-tube voltmeter of basically simple construction, yet offering linearity and other features not found in conventional instruments. While I have described the instrument as having a particular single range of operation, it will be understood that conventional methods of voltage dividing at the input may be utilized to scale a large range of imput voltages down to magnitudes acceptable to the instrument.

While I have described my invention in detail for the preferred form shown, it will be understood that modifications may be made within the scope of the invention as defined in the claim which follows.

I claim:

In a vacuum-tube voltmeter, a vacuum tube including a cathode and a grid and an anode, a cathode impedance with a selectively variable intermediate connection, B-supply means including a positive connection to said anode, means including a connection from said cathode impedance to the negative side of said B-supply means, rectifying means connected at one terminal to said grid, the other terminal of said rectifying means being connected to said variable connection of said cathode impedance, signal-input connections across said rectifying means, whereby said tube may conduct for zero voltages applied to said rectifying means, a voltage divider connected across said B-supply means, voltage-regulating means across a divided part of said divider, said divided part extending to the negative terminal of said divider, meter means connected to said voltage-regulating means on the positive side thereof and connected to said cathode impedance on the positive side thereof, whereby said meter means may be responsive to the difference in potential between that provided by said voltage-regulating means and that developed across said impedance, and a variable impedance in series with said meter means, whereby the sensitivity of said meter means may be adjusted independently of said adjustment for the reference input-voltage indication.

References Cited in the file of this patent

UNITED STATES PATENTS

| | | |
|---|---|---|
| 2,465,938 | Shonka | Mar. 29, 1949 |
| 2,492,901 | Sweet | Dec. 27, 1949 |
| 2,525,705 | Moore | Oct. 10, 1950 |

OTHER REFERENCES

Publication I Vacuum Tube Voltmeters by John F. Rider; John F. Rider Publisher, Inc., 404–4th Ave. New York 16, N. Y. Published February 1941 (in Division 69).